US008898876B2

(12) United States Patent
Feith

(10) Patent No.: US 8,898,876 B2
(45) Date of Patent: Dec. 2, 2014

(54) BARBED FITTINGS, FITTING INSERTION TOOLS AND METHODS RELATING TO SAME

(75) Inventor: Raymond P. Feith, Chino Hills, CA (US)

(73) Assignee: Rain Bird Corporation, Azusa, CA (US)

( * ) Notice: Subject to any disclaimer, the term of this patent is extended or adjusted under 35 U.S.C. 154(b) by 590 days.

(21) Appl. No.: 13/076,173

(22) Filed: Mar. 30, 2011

(65) Prior Publication Data

US 2012/0248759 A1 Oct. 4, 2012

(51) Int. Cl.
B23P 19/04 (2006.01)
B25B 27/10 (2006.01)
F16L 33/30 (2006.01)
F16L 47/32 (2006.01)
A01G 25/02 (2006.01)

(52) U.S. Cl.
CPC .................. *B25B 27/10* (2013.01); *F16L 33/30* (2013.01); *F16L 47/32* (2013.01); *A01G 25/026* (2013.01); *A01G 25/023* (2013.01)
USPC .............................................. 29/270; 29/278

(58) Field of Classification Search
USPC ........... 29/235, 238, 239, 244, 255, 253, 252, 29/263, 271, 278–281
See application file for complete search history.

(56) References Cited

U.S. PATENT DOCUMENTS

| 146,622 | A | 1/1874 | Valentine |
| 1,987,499 | A | 1/1935 | Tabozzi |
| 1,996,855 | A | 4/1935 | Cheswright |
| 2,314,000 | A | 3/1943 | Lusher et al. |
| 2,314,001 | A | 3/1943 | Lusher et al. |
| 2,626,167 | A | 1/1953 | Lake |

(Continued)

FOREIGN PATENT DOCUMENTS

| DE | 1214062 | 4/1966 |
| DE | 2949315 | 7/1980 |

(Continued)

OTHER PUBLICATIONS

Rain Bird Corporation, Landscape Drip/Xerigation 2005-2006 Catalog, p. 271, (catalog illustrates Models XM-TOOL and EMA-RBPX hole punch tools which were on sale publicly available more than one year prior to the filing date of the instant application).

(Continued)

*Primary Examiner* — Lee D Wilson
(74) *Attorney, Agent, or Firm* — Fitch, Even, Tabin & Flannery, LLP

(57) ABSTRACT

Barbed fittings having elongated bodies defining open ends and an internal fluid carrying passage interconnecting the ends are disclosed herein, with at least one end having a barb with a reduced outer diameter and/or taper angle to reduce the amount of insertion force necessary to install the fittings, thereby making the fittings easier to insert in conduit and/or other fluid carrying components. To also make the fittings easier to install, a barbed fitting insertion tool is disclosed having a body defining a fitting receptacle in a front portion of the body and a handle portion in the rear portion of the body for gripping and inserting fittings located in the fitting receptacle into conduit. The fitting receptacle having a locking mechanism for securing the fittings to the tool and preventing unintentional removal of same from the tool.

4 Claims, 9 Drawing Sheets

(56) References Cited

U.S. PATENT DOCUMENTS

| | | |
|---|---|---|
| D200,641 S | 3/1965 | Halligan |
| D204,670 S | 5/1966 | Gilson |
| D217,794 S | 6/1970 | Johnson |
| 3,641,655 A * | 2/1972 | Johnson .................... 29/243 |
| 3,680,893 A | 8/1972 | Giraud |
| D233,340 S | 10/1974 | Diedrich et al. |
| D235,343 S | 6/1975 | Otto |
| 3,944,261 A | 3/1976 | Reed et al. |
| 3,977,066 A | 8/1976 | Sands et al. |
| 3,980,325 A | 9/1976 | Robertson |
| 3,993,109 A | 11/1976 | Fortsch |
| D251,734 S | 5/1979 | McCaw et al. |
| D254,505 S | 3/1980 | Parsons et al. |
| D254,863 S | 4/1980 | Hayes |
| 4,226,815 A | 10/1980 | Cockman |
| 4,253,684 A | 3/1981 | Tolbert et al. |
| 4,257,629 A | 3/1981 | Maple et al. |
| D259,278 S | 5/1981 | McCaw et al. |
| D260,810 S | 9/1981 | Cleveland |
| 4,305,608 A | 12/1981 | Stuemky et al. |
| 4,334,551 A | 6/1982 | Pfister |
| 4,349,049 A | 9/1982 | Silvey |
| 4,392,616 A | 7/1983 | Olson |
| 4,392,678 A | 7/1983 | Adamczyk |
| 4,408,786 A | 10/1983 | Stuemky |
| 4,460,129 A | 7/1984 | Olson |
| 4,479,796 A | 10/1984 | Kallok |
| 4,511,163 A | 4/1985 | Harris et al. |
| 4,522,339 A | 6/1985 | Costa |
| 4,526,572 A | 7/1985 | Donnan et al. |
| D282,962 S | 3/1986 | Gerber |
| D283,641 S | 4/1986 | Spetzler et al. |
| D283,725 S | 5/1986 | Mahoney |
| D284,222 S | 6/1986 | Hamilton |
| 4,597,594 A | 7/1986 | Kacalieff et al. |
| 4,635,972 A | 1/1987 | Lyall |
| 4,650,473 A | 3/1987 | Bartholomew et al. |
| D290,646 S | 6/1987 | Cook |
| 4,693,707 A | 9/1987 | Dye |
| 4,703,957 A | 11/1987 | Blenkush |
| 4,722,481 A | 2/1988 | Lemkin |
| 4,726,612 A | 2/1988 | Picton |
| 4,745,950 A | 5/1988 | Mathieu |
| 4,757,588 A | 7/1988 | Churchich |
| 4,765,048 A * | 8/1988 | Hokanson .................... 29/221.5 |
| 4,778,447 A | 10/1988 | Velde et al. |
| 4,790,832 A | 12/1988 | Lopez |
| D300,361 S | 3/1989 | Tokarz |
| 4,971,366 A | 11/1990 | Towsley |
| 4,994,048 A | 2/1991 | Metzger |
| 5,057,074 A | 10/1991 | Suzuki et al. |
| 5,076,615 A | 12/1991 | Sampson |
| 5,092,849 A | 3/1992 | Sampson |
| 5,098,395 A | 3/1992 | Fields |
| 5,104,150 A | 4/1992 | Bard et al. |
| 5,105,854 A | 4/1992 | Cole et al. |
| 5,139,483 A | 8/1992 | Ryan |
| 5,140,738 A | 8/1992 | Pinkerman, Jr. |
| D333,178 S | 2/1993 | Novy |
| D333,179 S | 2/1993 | Mikiya et al. |
| 5,205,821 A | 4/1993 | Kruger et al. |
| 5,257,826 A | 11/1993 | Prassas et al. |
| 5,259,894 A | 11/1993 | Sampson |
| 5,335,943 A | 8/1994 | Duryea |
| 5,335,944 A | 8/1994 | Mitsui et al. |
| 5,381,832 A | 1/1995 | Mitsui |
| 5,405,339 A | 4/1995 | Kohnen et al. |
| 5,483,731 A | 1/1996 | Prendel et al. |
| 5,507,532 A | 4/1996 | Mitsui |
| 5,527,072 A | 6/1996 | Norkey |
| D372,093 S | 7/1996 | Sampson et al. |
| 5,553,786 A | 9/1996 | Israel |
| D375,160 S | 10/1996 | Sampson et al. |
| 5,573,280 A | 11/1996 | Salter et al. |
| 5,592,726 A | 1/1997 | Suresh |
| 5,620,427 A | 4/1997 | Werschmidt et al. |
| D380,667 S | 7/1997 | Kanamori et al. |
| D382,639 S | 8/1997 | Musgrave et al. |
| D387,147 S | 12/1997 | Vandermast et al. |
| D388,876 S | 1/1998 | Sampson |
| 5,722,307 A * | 3/1998 | Chen .................... 81/58.3 |
| 5,772,262 A | 6/1998 | Dupont et al. |
| 5,947,931 A | 9/1999 | Bierman |
| 6,050,608 A | 4/2000 | Hattori et al. |
| 6,086,115 A | 7/2000 | Sahu |
| D429,627 S | 8/2000 | Gradwell |
| 6,152,913 A | 11/2000 | Feith et al. |
| D441,435 S | 5/2001 | Patteson et al. |
| 6,231,085 B1 | 5/2001 | Olson |
| D445,182 S | 7/2001 | Haynes |
| 6,302,451 B1 | 10/2001 | Olson |
| D451,174 S | 11/2001 | Patteson et al. |
| D451,584 S | 12/2001 | Patteson et al. |
| D453,817 S | 2/2002 | Patteson et al. |
| 6,412,484 B1 | 7/2002 | Izuchukwu et al. |
| 6,443,500 B1 | 9/2002 | Inoue et al. |
| D468,015 S | 12/2002 | Horppu |
| 6,516,496 B2 | 2/2003 | Ekron |
| D471,261 S | 3/2003 | Kozu |
| D471,262 S | 3/2003 | Kozu |
| 6,540,264 B1 | 4/2003 | Yokoyama et al. |
| 6,581,262 B1 | 6/2003 | Myers |
| D487,148 S | 2/2004 | Ellingboe et al. |
| D488,866 S | 4/2004 | O'Dell |
| 6,726,253 B2 | 4/2004 | Inoue et al. |
| 6,779,269 B2 | 8/2004 | Green et al. |
| 6,783,160 B2 | 8/2004 | Rowley |
| 6,899,355 B2 | 5/2005 | Klein et al. |
| D508,980 S | 8/2005 | Bigelow |
| 6,928,708 B1 | 8/2005 | Larock |
| 6,988,747 B2 | 1/2006 | Allen et al. |
| 7,014,215 B2 | 3/2006 | Cooper et al. |
| 7,014,218 B2 | 3/2006 | Fisher et al. |
| D518,573 S | 4/2006 | French |
| D530,796 S | 10/2006 | Zielke et al. |
| 7,134,696 B2 | 11/2006 | Poll |
| 7,163,238 B1 | 1/2007 | Mittersteiner et al. |
| 7,293,804 B2 | 11/2007 | Li et al. |
| D558,553 S | 1/2008 | Feith |
| 7,322,617 B2 | 1/2008 | Paquis |
| 7,346,986 B2 | 3/2008 | Feith |
| 7,360,800 B2 | 4/2008 | Poll et al. |
| D570,457 S | 6/2008 | Brown |
| 7,448,653 B2 | 11/2008 | Jensen et al. |
| 7,494,479 B2 | 2/2009 | Montalvo et al. |
| 7,497,480 B2 | 3/2009 | Kerin et al. |
| 7,506,899 B2 | 3/2009 | Feith |
| 7,543,858 B1 | 6/2009 | Wang |
| D597,637 S | 8/2009 | Krohmer et al. |
| D599,629 S | 9/2009 | Pearce |
| 7,658,420 B2 | 2/2010 | Harger et al. |
| D614,938 S | 5/2010 | Barrese |
| 7,717,475 B2 | 5/2010 | Savelle, Jr. et al. |
| 7,731,244 B2 | 6/2010 | Miros et al. |
| 7,757,704 B2 | 7/2010 | Lien |
| 7,770,939 B2 | 8/2010 | Jensen et al. |
| D628,035 S | 11/2010 | Paige |
| 7,862,090 B1 | 1/2011 | Foreman |
| 7,878,553 B2 | 2/2011 | Wicks et al. |
| 7,976,071 B2 | 7/2011 | Bibby |
| D648,191 S | 11/2011 | Thayer et al. |
| 8,256,081 B2 * | 9/2012 | Fridman .................... 29/255 |
| 2002/0096023 A1 | 7/2002 | Sanford |
| 2006/0006643 A1 | 1/2006 | Schultz |
| 2006/0053608 A1 | 3/2006 | Wu |
| 2007/0134980 A1 | 6/2007 | Poll et al. |
| 2007/0236010 A1* | 10/2007 | Campau .................... 285/242 |
| 2008/0012303 A1 | 1/2008 | Poll et al. |
| 2008/0092337 A1 | 4/2008 | Gross |
| 2008/0221469 A1 | 9/2008 | Shevchuk |
| 2008/0272594 A1 | 11/2008 | Phillipps |
| 2009/0212559 A1 | 8/2009 | Werth |
| 2009/0232595 A1 | 9/2009 | Willemstyn et al. |
| 2009/0278347 A1 | 11/2009 | Kerin et al. |

(56) References Cited

U.S. PATENT DOCUMENTS

| | | |
|---|---|---|
| 2010/0007134 A1 | 1/2010 | Elton et al. |
| 2010/0013215 A1 | 1/2010 | Werth |
| 2010/0032943 A1 | 2/2010 | Li et al. |
| 2010/0052313 A1 | 3/2010 | Ishida et al. |
| 2010/0066073 A1 | 3/2010 | Jensen et al. |
| 2010/0077584 A1* | 4/2010 | Fridman .................. 29/244 |
| 2010/0078934 A1 | 4/2010 | Matsunaga |
| 2010/0090461 A1 | 4/2010 | Spielmann |
| 2010/0109319 A1 | 5/2010 | Zhang et al. |
| 2010/0112261 A1 | 5/2010 | Van Lumig et al. |
| 2010/0129140 A1 | 5/2010 | Lyon |
| 2010/0133807 A1 | 6/2010 | Bilstad et al. |
| 2010/0176589 A1 | 7/2010 | Bauer |
| 2010/0219629 A1 | 9/2010 | Kerin et al. |
| 2010/0225104 A1 | 9/2010 | Ully et al. |
| 2010/0225108 A1 | 9/2010 | Mann |
| 2010/0230961 A1 | 9/2010 | Johnson |
| 2010/0244438 A1 | 9/2010 | Johanson |
| 2010/0301599 A1 | 12/2010 | Jensen et al. |
| 2010/0327579 A1* | 12/2010 | Montena .................. 285/382 |
| 2011/0016682 A1 | 1/2011 | Wood, III |
| 2012/0248759 A1* | 10/2012 | Feith ..................... 285/39 |

FOREIGN PATENT DOCUMENTS

| | | |
|---|---|---|
| DE | 3003368 | 8/1981 |
| EP | 0530404 | 3/1993 |
| GB | 2049856 | 12/1980 |

OTHER PUBLICATIONS

Rain Bird Corporation, Xerigation 2001 Catalog, p. 199 (catalog illustrates Models XM-TOOL and EMA-BGX hole punch tools which were on sale publicly available more than one year prior to the filing date of the instant application).

United States Patent and Trademark Office, Trademark Electronic Search System (TESS) Database Record, U.S. Trademark Registration No. 1,817,921, Registered Jan. 25, 1994, 1 p.

United States Patent and Trademark Office, Trademark Electronic Search System (TESS) Database Record, U.S. Trademark Registration No. 1,817,922, Registered Jan. 25, 1994, 1 p.

United States Patent and Trademark Office, Trademark Electronic Search System (TESS) Database Record, U.S. Trademark Registration No. 2,535,232, Registered Feb. 5, 2002, 1 p.

United States Patent and Trademark Office, Trademark Electronic Search System (TESS) Database Record, U.S. Trademark Registration No. 2,535,234, Registered Feb. 5, 2002, 1 p.

United States Patent and Trademark Office, Trademark Electronic Search System (TESS) Database Record, U.S. Trademark Registration No. 2,616,170, Registered Sep. 10, 2002, 1 p.

United States Patent and Trademark Office, Trademark Electronic Search System (TESS) Database Record, U.S. Trademark Registration No. 2,655,263, Registered Dec. 3, 2002, 1 p.

United States Patent and Trademark Office, Trademark Electronic Search System (TESS) Database Record, U.S. Trademark Registration No. 2,966,701, Registered Jul. 12, 2005, 1 p.

United States Patent and Trademark Office, Trademark Electronic Search System (TESS) Database Record, U.S. Trademark Application No. 74/394523, Published Oct. 11, 1994, Abandoned May 16, 1997, 3 pp.

International Searching Authority, International Search Report and Written Opinion of the International Searching Authority corresponding to International Application No. PCT/US2012/030921, Jun. 28, 2012, 10 pp.

Olson Irrigation Systems, Olson Irrigation Systems Emitters: Mini-Sprinkler Accessories, 2001, 3 pp.

Wood Block Fitting Tool, author unkown, photographs depicting a fitting tool that Applicant believes was in use or publicly available more than one year before the filing of the instant application, 2 pp.

Rain Bird Corporation, Agriculture Irrigation Equipment 1981 Catalog, p. 5 (1981).

Rain Bird Corporation, Turf Irrigation Equipment 1982 Catalog, p. 69 (1982).

Rain Bird Corporation, Turf Irrigation Equipment 1983 Catalog, p. 67 (1983).

Rain Bird Corporation, Turf Irrigation Equipment 1985 Catalog, pp. 73-75 (1984).

Rain Bird Corporation, Nursery Equipment Catalog 1986/1987, pp. 5, 14, 15 (1986).

Rain Bird Corporation, Turf Irrigation Equipment 1987 Catalog, pp. 13, 95 (1987).

Rain Bird Corporation, Landscape Irrigation Products 1993-1994 Catalog, pp. 123, 125 (Feb. 1993).

Rain Bird Corporation, 1994 Drip Watering System Catalog, pp. 10-13 (1993).

Rain Bird Corporation, PC Dripline Pressure Compensating Inline Emitter Tubing, 16 pp. (Mar. 1999).

Rain Bird Corporation, Do-It-Yourself Watering Systems, p. 18 (1994).

Rain Bird Corporation, Landscape Irrigation Products 2005-2006 Catalog, pp. 242, 250, 252, 254, 271, 272 (Jun. 2004).

Rain Bird Corporation, Landscape Irrigation Products 2006-2007 Catalog, pp. 240, 243, 245, 246, 264 (Jul. 2005).

* cited by examiner

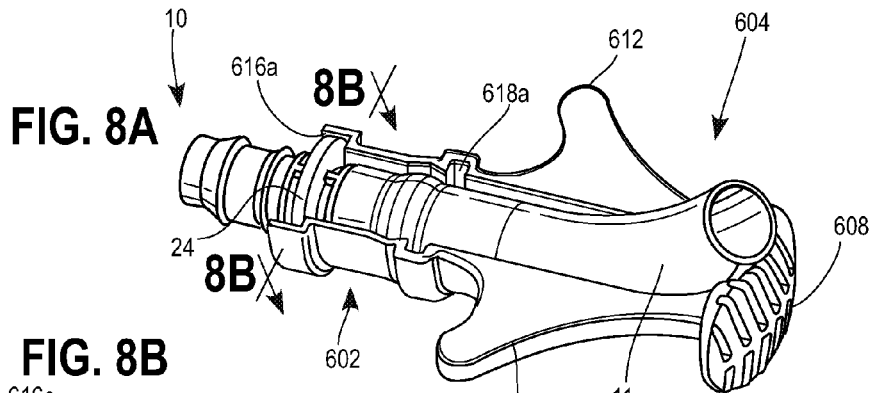
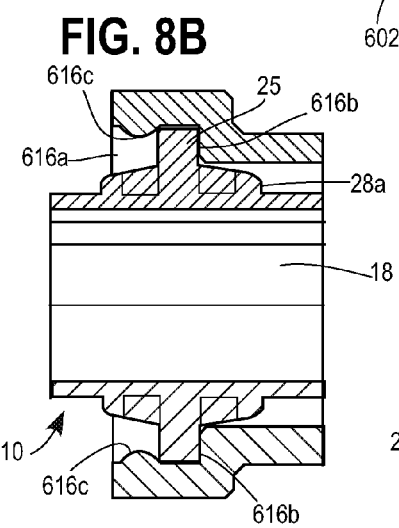
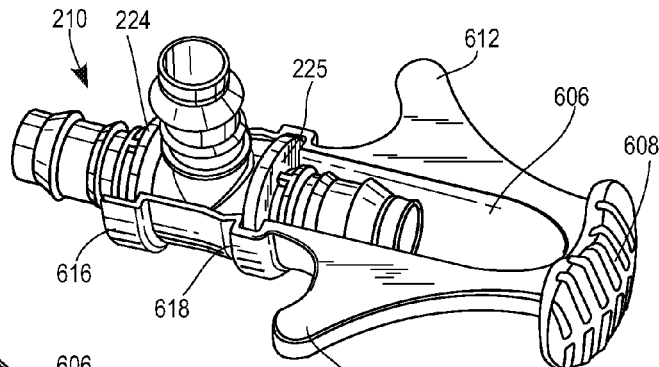
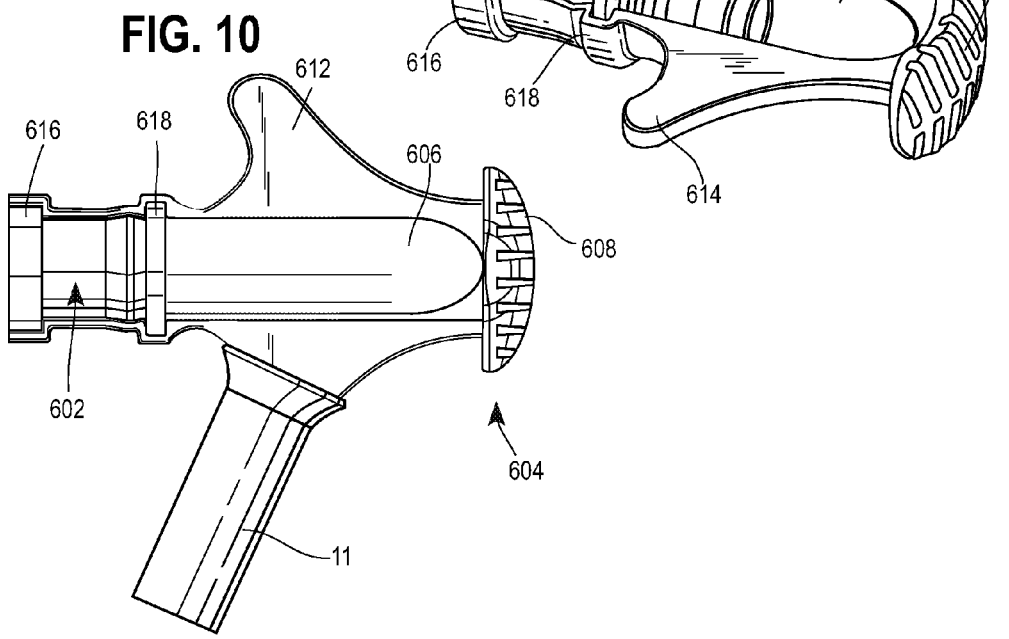

BARBED FITTINGS, FITTING INSERTION TOOLS AND METHODS RELATING TO SAME

FIELD

The present invention relates to barbed fittings and fitting insertion tools for installing same and, more particularly, to barbed fittings for irrigation drip lines and insertion tools for installing these fittings in the flexible drip line tubing, and methods relating to same.

BACKGROUND

Barbed fittings are used to connect various types of conduit together and to attach irrigation components to tubing. Conventional fittings are typically designed to have barbed ends that allow for the fitting to be inserted into an end of the conduit, with the barbs resisting separation of the fitting and conduit once inserted therein. Unfortunately, the diameter of existing fittings and angle of barbs used with same often make it relatively difficult to insert the fittings into the conduit. This difficulty is often increased because such items are used around fluid applications and can become slippery due to the presence of fluid. More particularly, these fittings are often difficult to install because a relatively high insertion force is needed to press the fitting into the tube, and the fittings typically only have a small surface area for the user to grip the fitting. A conventional fitting is illustrated in FIG. 12, which includes an outer barb diameter "D" of sixty-eight hundredths of an inch (0.680 in.) and a barb angle X of twenty-four degrees (24°). Other conventional barbed fittings have comparable barb diameters and angles to the fitting of FIG. 12; while still others have different dimensions, but similar configurations.

A common form of flexible tubing used with such fittings is XF™ series dripline provided by the assignee of this application, Rain Bird Corporation of Azusa, Calif. (U.S.). The average insertion and extraction (or pull out) forces of the conventional fitting illustrated in FIG. 12 in XF™ dripline is fifty-eight pounds force (58 lbs.) and one hundred twenty pounds force (120 lbs.), respectively. Although this insertion force is tolerable, and less than other tubing available on the market, it is still desirable to lower the insertion force required to install the fitting into XF™ dripline, as well as other brands of irrigation tubing.

To assist users in installing barbed fittings into conduit, some fitting insertion tools have been provided. For example, U.S. Pat. No. 4,757,588 issued Jul. 19, 1988 to Churchich discloses pliers for inserting the ends of hoses onto hose fittings, such as for pressure cylinders, manifolds and the like. Unfortunately, the tool requires a complicated scissors type pivot or hinged action, requires good hand strength for squeezing the handles of the pliers together and is only shown for use with hose fittings having a threaded end that is already secured in a house wall, or the like, and having a hexagonal or other polygonal head or base which the lower jaw of the pliers can engage to drive the other jaw towards the fitting. The tool also requires operator action that is not in coaxial alignment with the direction the operator wishes the fitting or conduit to travel in, but rather offset from this alignment which makes the insertion task that much more awkward and difficult.

Another pliers type tool is disclosed in U.S. Pat. No. 6,581,262 issued Jun. 24, 2003 to Myers. This tool is used for installing barb emitters on irrigation tubing; however, the jaws of the tool are used to hold and punch conduit to create a hole for installing an emitter barb. Three studs are mounted on a handle of the tool which can be used to press the emitter barb into the hole of the conduit. Unfortunately, these studs only engage the emitter barb as guides or stops and do not secure the emitter barb to the tool. Thus, an operator must hold the emitter barb in place with one hand and operate the tool with the other hand, thereby leaving the conduit either unattended or poorly attended because the operator is trying to hold both the conduit and fitting with one hand. Like the Churchich pliers, the tool requires operator action that is not in coaxial alignment with the direction the operator wishes the fitting or conduit to travel in, but rather offset from this alignment which makes the insertion task that much more awkward and difficult. In addition and like the Churchich pliers, the tool only can only be used to install conduit on one side of the fitting as both disclose fittings that are already connected on their other ends.

U.S. Pat. No. 6,928,708 issued Aug. 16, 2005 to Larock, discloses a hand-held device for selectively attaching a water drip system connector to a water drip system conduit; however, the tool can only be used to install straight coupling type fittings with an uninterrupted, constant outer diameter, and circumference shaft located between the barbed ends and not the variety of fitting types currently used in the marketplace (e.g., elbow, tee, adaptor, etc.). Larock further requires the operator to hold the tool coaxially (e.g., like a flashlight) and, thus, lacks an effective gripping and drive surface that the operator can use to drive the fitting into the conduit using the same motion and direction of travel as the operator wishes the fitting to travel in.

Lastly, U.S. Pat. No. 6,516,496 issued Feb. 11, 2003 to Ekron iscloses a tool with first and second elements hingedly interconnected which can be closed around a variety of different fittings to insert the fittings into conduit. Unfortunately, the tool requires the opening and shutting of tool parts in order to grip and insert the fitting and/or in order to remove, re-orientate and re-insert the fitting into the tool to install the fitting in conduit. The tool also requires careful alignment of the fitting and feeding of conduit through specific openings formed in the hinged elements in order to use the tool to insert fittings into conduit that already have sections of conduit connected to other ends of the fitting. Ekron, like Larock, further requires the operator to hold the tool coaxially and, thus, lacks an effective gripping and drive surface that the operator can use to drive the fitting into the conduit using the same motion and direction of travel as the operator wishes the fitting to travel in.

Therefore, there is a desire for improved fittings and insertion tools that aid with the insertion of such fittings in conduit.

BRIEF DESCRIPTION OF THE DRAWINGS

FIG. 8A is a perspective view of the tool of FIGS. 7A-D illustrating the tool with a coupling secured thereto, the coupling having a first section of tubing connected to a barbed end thereof, FIG. 8B is a partial cross-section of FIG. 8A illustrating one way in which the fitting may be captured within the fitting receptacle;

FIG. 10 is a left side elevational view of the tool of FIGS. 7A-D illustrating how one of the flanged ends of the tool may be inserted into conduit to flare or stretch the conduit opening so that it is easier to insert a fitting therein;

DETAILED DESCRIPTION OF THE PREFERRED EMBODIMENTS

Barbed fittings and fitting insertion tools in accordance with the invention are disclosed herein and will be discussed in further detail below. In addition, methods associated with said fittings and fitting insertion tools are also disclosed, including but not limited to, methods of reducing the amount of insertion force required for a barbed fitting and methods of inserting a barbed fitting into conduit using an insertion tool.

Figure 6A:
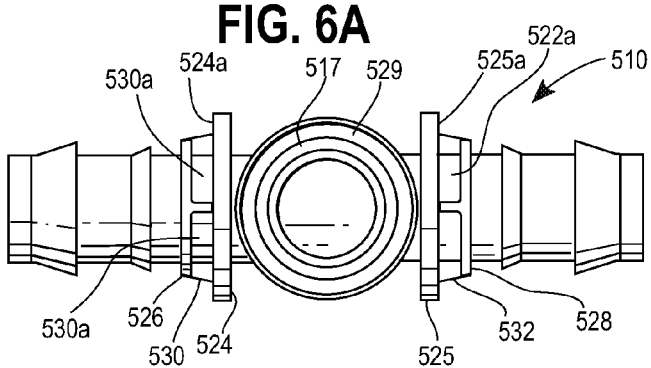
FIGS. 6A-C are top plan, cross-sectional and side elevational views of a tee male thread connector type barbed fitting in accordance with another form of the present invention, the cross-section being taken along line B-B in FIG. 3A and the fitting being symmetrical about line B-B.
Figure 6B:
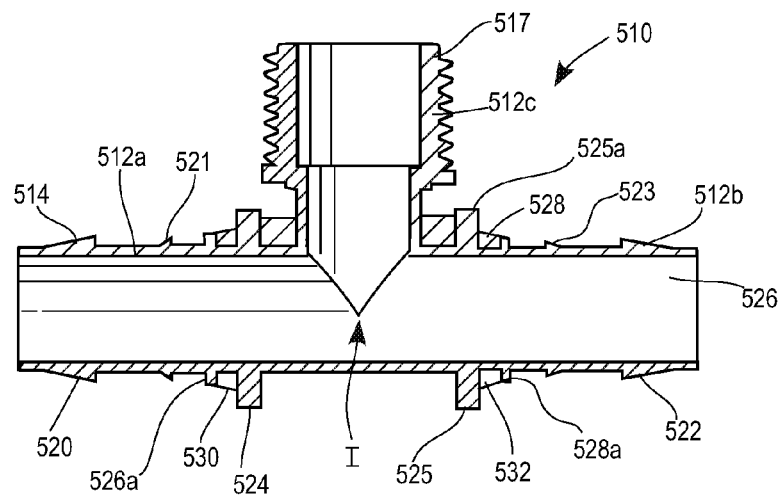
Figure 6C:
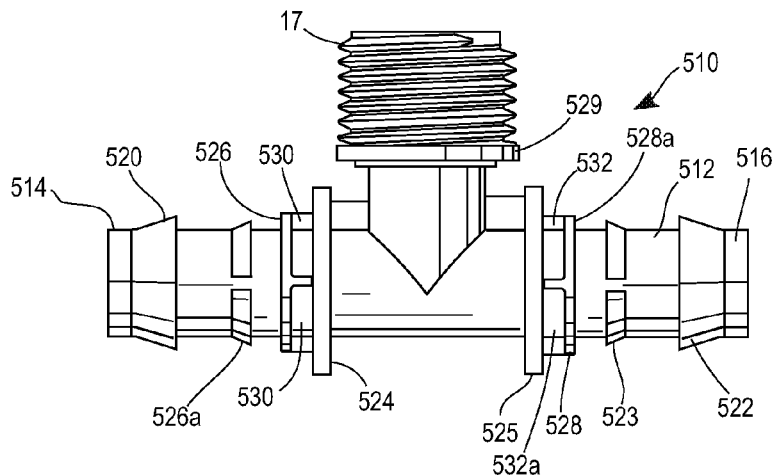

In FIGS. 1-6C, exemplary barbed fittings in accordance with the invention are disclosed which offer reduced insertion forces. The fittings comprise bodies defining internal fluid carrying passages having at least one barbed end for securing the fitting in a conduit end. The fittings can be configured in a variety of ways including, but not limited to, couplings (FIGS. 1A-B), elbows (FIGS. 2A-C), tees (FIGS. 3A-C), male adapters (FIGS. 4A-B and 5A-B), and tee male thread connectors (FIGS. 6A-C).

Figure 1A:
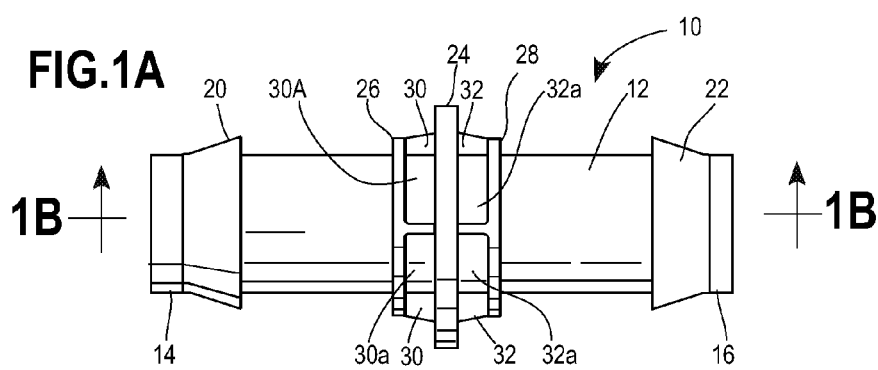
FIGS. 1A-B are top plan and cross-sectional views of a coupling type barbed fitting in accordance with one form of the present invention, the cross-section being taken along line B-B in FIG. 1A and the fitting being symmetrical about line B-B.
Figure 1B:
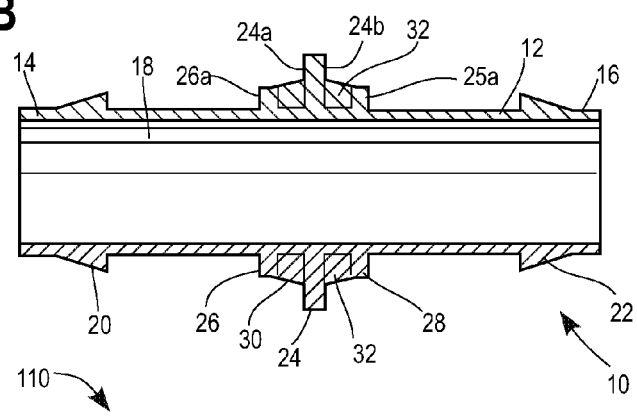

Turning now to FIGS. 1A-B, in which a coupling fitting 10 is illustrated, the coupling 10 being a connector having an axially elongated one-piece molded plastic body 12 having opposite open ends 14 and 16, and an internal fluid carrying passage 18 interconnecting the opposite ends 14, 16. The body 12 having a leak proof uninterrupted wall defining the passage 18 extending through the elongated body 12. The end sections 14, 16 each having an externally formed barb 20, 22 of progressively increasing diameter to provide a tapering configuration that diverges toward a midsection of the body 12.

The midsection of the body 12 having a large radially-outwardly extending, circumferential alignment flange 24 centrally located on the body 12 and radially-outwardly extending abutment flanges 26 and 28 equally spaced axially from opposite sides 24a, 24b of the alignment flange 24. A plurality of connecting webs 30 and 32 extend between the abutment flanges 26, 28 and the alignment flange 24 thereby defining multiple recesses 30a, 32a between the alignment flange 24 and the abutment flanges 26, 28 around the circumferential exterior of the body 12. In a preferred form, the abutment flanges 26, 28 are of a smaller diameter (e.g., 0.640 in.) than the alignment flange (e.g., 0.900 in.), and both the abutment flanges 26, 28 and the connecting webs 30, 32 progressively increase in diameter to provide a tapering configuration that diverges toward the midsection of the body 12, where the alignment flange 24 is located. While the tapering configuration of the barbs 20, 22 is more for assisting the user in installing the fitting ends 14, 16 into conduit, the tapering configuration of the connecting webs 30, 32 is for injection molding purposes (e.g., by having a slight radius change to the outer surfaces of the connecting webs 30, 32 makes the fitting 10 easier to injection mold as the molding material more easily travels on sloped surfaces and more uniformly molds the desired shape).

During installation of the fitting 10, either end 14, 16 of fitting 10 is inserted into an open end of conduit until the end of the conduit abuts the outer side 26a or 28a of the abutment flange 26 or 28. Once the end of the conduit abuts the abutment flange 26 or 28, that end of the coupling 10 has been fully inserted into or installed on the conduit, and the other end 16, 14 of the fitting 10 is now ready to be inserted into another open end of conduit. For example, the first end 14 of fitting 10 may be inserted into an open end of conduit and forced into the conduit until the open end of the conduit abuts the outer surface 26a of abutment flange 26. At this point, the first end 14 of fitting 10 is considered to be fully installed or inserted into the conduit. Once done, the process can be repeated by inserting the opposite end 16 of the fitting 10 into another open conduit end and forcing the fitting into the conduit until the open end of the conduit abuts the outer surface 28a of abutment flange 28.

As mentioned above, a user may force the ends 14, 16 of the fitting 10 into open ends of conduit by either pressing on the distal end of opposite end 16, 14 of the fitting 10 (assuming the opposite end has not already been inserted into conduit itself) with his or her thumb or palm, or pushing on the outer axial circumference of opposite end 16, 14 or the conduit connected over this portion (if already installed in conduit) using his or her thumb and at least one finger (e.g., index finger, etc.). In order to reduce the amount of insertion force that is required to insert fitting 10 into conduit, the fitting 10 has been designed with a smaller outer barb diameter and a smaller barb taper than conventional fittings. For example, in the form illustrated, the outer barb diameter has been reduced from six hundred eighty thousands of an inch (0.680 in.) to six hundred thirty thousands of an inch (0.630 in.) plus or minus three hundredths of an in. (±0.03 in.), and the barb taper or angle has been reduced from twenty four degrees (24°) to fourteen degrees (14°) plus or minus two degrees (±2°). At six hundred thirty thousandths of an inch (0.630 in.) and fourteen degrees (14°), the length of tube engagement, which is the length from the spot where the tube initially engages the barb surface near the ends 14, 16 to the sharp end of the barb (or point at the outermost diameter of the barb), is one hundred eighty nine thousandths of an inch (0.189 in.).

The average insertion and pull out forces of the fitting illustrated in FIGS. 1A-B, in XF™ dripline is thirty-seven pounds force (37 lbs.) and one hundred twenty-five pounds force (125 lbs.), respectively. Thus, when used with XF™ dripline the insertion force of fitting 10 has decreased by thirty-six percent (36%), while the pull out force has actually increased four percent (4%) over the conventional fitting of FIG. 12. Reduction of the insertion force has been found to happen with other conventional tubing as well. Therefore, the fitting 10 reduces the overall insertion force required to insert the fitting into conduit, while still maintaining an acceptable pull out force.

Although this change to the outer barb diameter and barb taper has also reduced the length of tube engagement from two hundred fifty-three thousands of an inch (0.253 in.) to one hundred eighty-nine thousands of an inch (0.189 in.), the pull out force remains within an acceptable range (e.g., minimum pull out force of fifty-five pounds force (55 lbs.)). The outer barb diameter and barb taper may be altered in a variety of different combinations so long as the insertion force ranges between thirty pounds force and fifty-seven pounds force (29-57 lbs.). In a preferred form, however, the outer barbed diameter and barb taper are altered with respect to each other in order to keep the insertion force range between thirty-seven and forty-nine pounds force (37-49 lbs.).

Figure 2A:
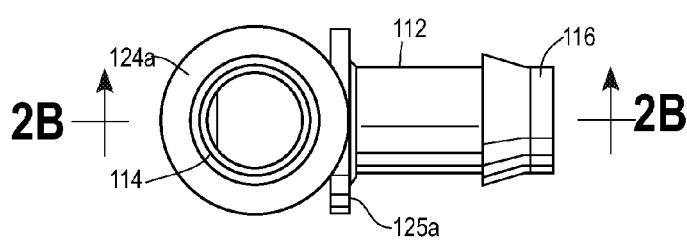
FIGS. 2A-C are top plan, cross-sectional and side elevational views of an elbow type barbed fitting in accordance with another form of the present invention, the cross-section being taken along line B-B in FIG. 2A and the fitting being symmetrical about line B-B.
Figure 2C:
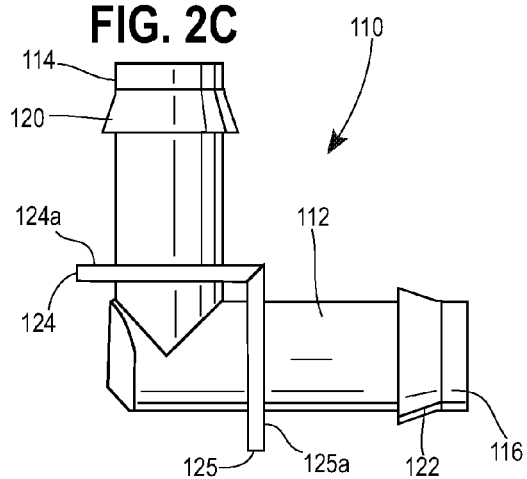
Figure 2B:
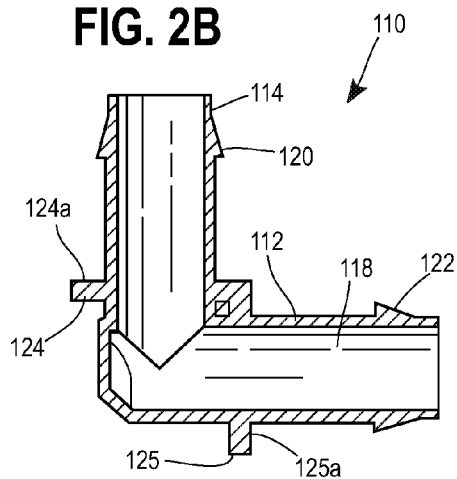

Turning now to FIGS. 2A-C, wherein there is illustrated an elbow fitting that has a reduced outer barb diameter and barb taper in order to make the fitting easier to insert into conduit, while still maintaining sufficient extraction force. For convenience, items which are similar to those discussed above with respect to fitting 10 will be identified using the same two digit reference numeral in combination with the prefix "1" merely to distinguish one embodiment from the other. Thus, the fitting illustrated in FIGS. 2A-C is identified using reference numeral 110 since it is similar to fitting 10 discussed above.

The fitting 110 includes an elongated body 112 having opposite open ends 114 and 116, and an internal fluid carrying passage 118 interconnecting the opposite ends 114, 116. The body 112 having a leak proof uninterrupted wall defining the passage 18 extending through the elongated body 112. The end sections 114, 116 each having externally formed barbs 120, 122 of progressively increasing diameter to provide a tapering configuration that diverges toward a midsection of the body 112. However, unlike the coupling 10 above, the body 112 of elbow fitting 110 is bent at an angle and has two large radially-outwardly extending, circumferential alignment flanges 124 and 125 positioned on the midsection of the body 112 equidistant from the open ends 114, 116, respectively, of the elbow fitting body 112. In a preferred form, the body 112 is bent into an "L" or ninety degree (90°) shape with the alignment flanges 124, 125 extending perpendicularly to one another and connecting at a point of intersection.

In addition, in the embodiment illustrated, the elbow fitting 110 does not have abutment flanges or their associated connecting webs. Rather, the outer surfaces 124a and 125a of flanges 124, 125 serve as abutment surfaces or stops against which the conduit may be pushed up against to indicate when each end 114, 116 is fully inserted within the conduit. In a preferred form of the invention, the alignment flanges 124, 125 have a relatively large diameter (e.g., 0.900 in.), and the diameter of fluid carrying passage 118 remains essentially constant between the first and second open ends 114, 116. There may be some variance in diameter along the fluid carrying passage 118 due to a drafting requirement of the molding process.

In order to reduce the amount of insertion force that is required to insert fitting 110 into conduit, the fitting 110 has been designed with a smaller outer barb diameter and a smaller barb taper than conventional fittings. For example, in the form illustrated, the outer barb diameter has been reduced from six hundred eighty thousands of an inch (0.680 in.) to six hundred thirty thousands of an inch (0.630 in.), and the barb taper has been reduced from twenty four degrees (24°) to fourteen degrees (14°). It should be understood, however, that other outer barb diameters may be selected from a range of six hundred ten thousands of an inch to six hundred sixty thousandths (0.610 in. to 0.660 in.).

Figure 3A:
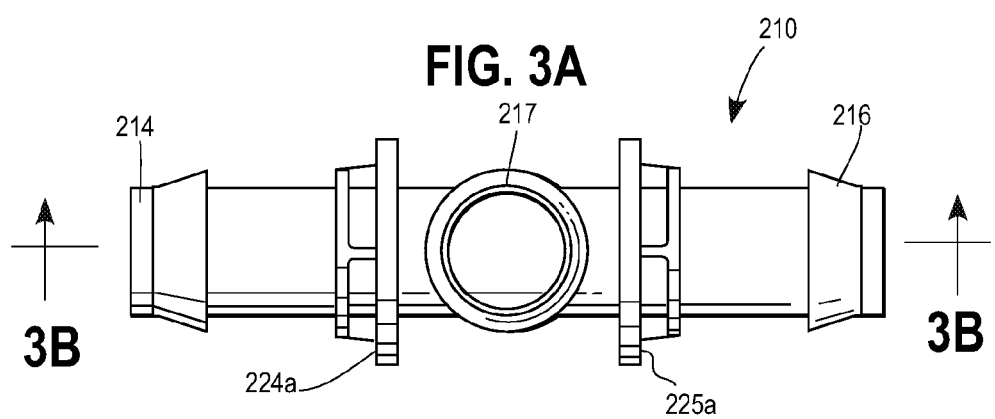
FIGS. 3A-C are top plan, cross-sectional and side elevational views of a tee type barbed fitting in accordance with another form of the present invention, the cross-section being taken along line B-B in FIG. 3A and the fitting being symmetrical about line B-B.
Figure 3B:
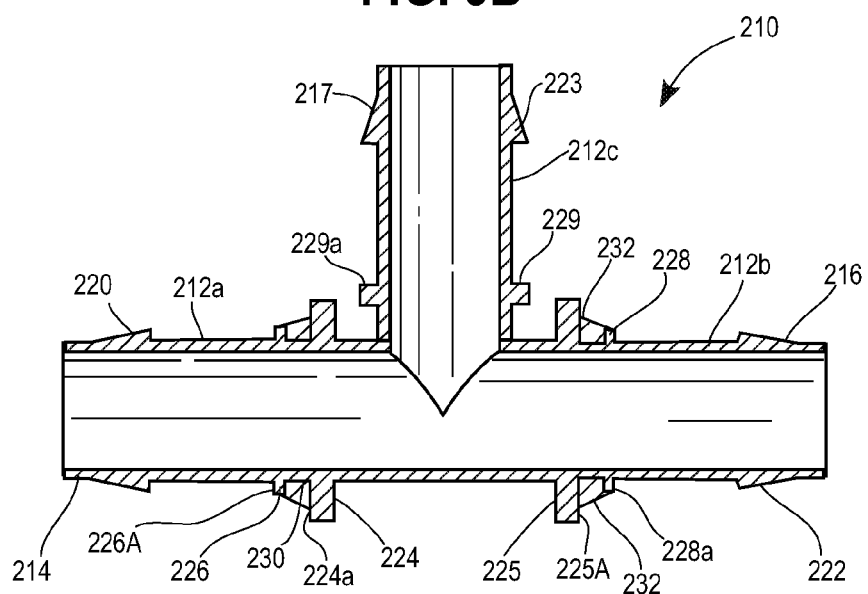
Figure 3C:
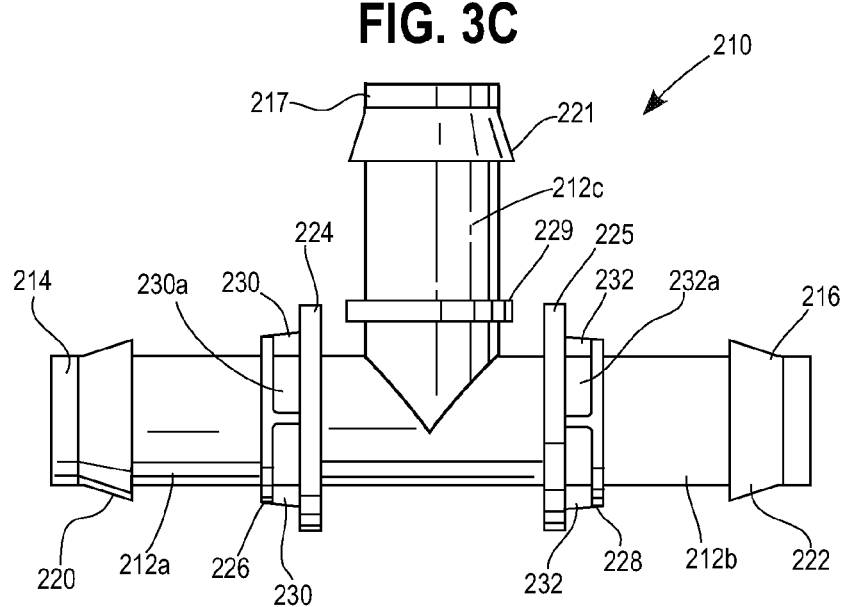
Figure 4A:
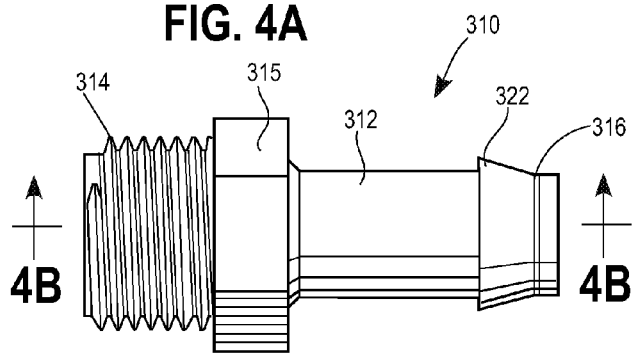
FIGS. 4A-B are top plan and cross-sectional views of a male adapter/MPT type barbed fitting in accordance with one form of the present invention, the cross-section being taken along line B-B in FIG. 4A and the fitting being symmetrical about line B-B.
Figure 4B:
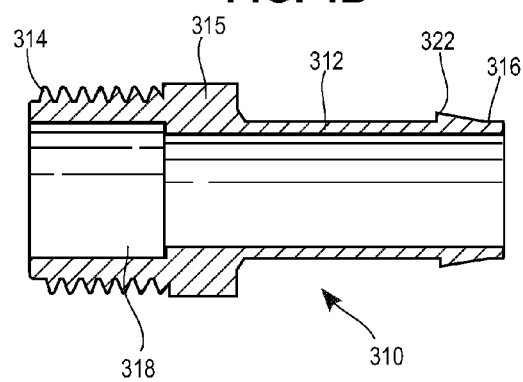
Figure 5A:
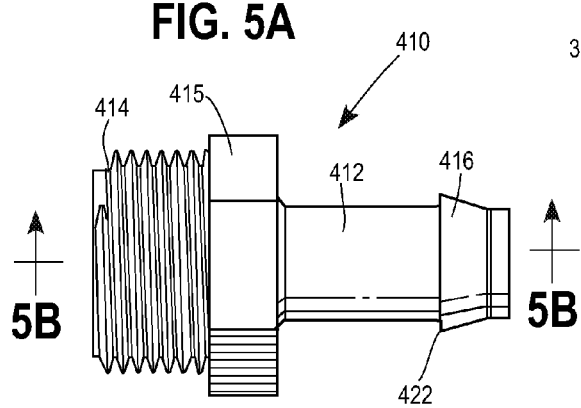
FIGS. 5A-B are top plan and cross-sectional views of another male adapter/MPT type barbed fitting in accordance with one form of the present invention, the cross-section being taken along line B-B in FIG. 4A and the fitting being symmetrical about line B-B.
Figure 5B:
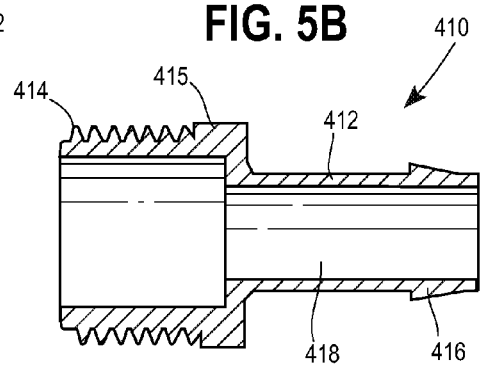

A tee type fitting is illustrated in FIGS. 3A-C and includes a body that is somewhat of a combination of the straight coupling 10 and elbow fitting 110 discussed above. Thus, for convenience, items which are similar to those discussed above with respect to fittings 10 and 110 will be identified using the same two digit reference numeral in combination with the prefix "2" merely to distinguish one embodiment from the other. Therefore, the fitting illustrated in FIGS. 3A-C is identified using reference numeral 210 since it is similar to fittings 10 and 110 discussed above.

The tee fitting 210 includes an elongated body 212 having three open ends 214, 216 and 217, and an internal "T" shaped fluid carrying passage 218 interconnecting the ends 214, 216 and 217. The body 212 having a leak proof wall defining the passage 218 extending through the elongated body 212, which is made-up of three uninterrupted wall sections 212a, 212b and 212c. The end sections 214, 216 and 217 each having externally formed barbs 220, 222 and 223 of progressively increasing diameter to provide a tapering configuration that diverges toward a midsection of the body 212 where all three body sections 212a, 212b and 212c intersect. Like the elbow fitting 110 (and unlike the coupling 10), the body 212 has two large radially-outwardly extending, circumferential alignment flanges 224 and 225 positioned on the midsection of the body 212. Each is equidistant from its adjacent open end 214 and 216. The alignment flanges 224 and 225 extend in planes that are generally parallel to one another and perpendicular to the longitudinal axis of the fluid carrying passage portion made up of sections 212a and 212b of body 212 and extending between ends 214 and 216.

Unlike the elbow fitting 110 (but like the coupling 10), the tee fitting 210 further includes radially-outwardly extending abutment flanges 226, 228 and 229 equally spaced from the open ends 214, 216 and 217 and, with respect to abutment flanges 226 and 228, axially from the alignment flanges 224 and 225. A plurality of connecting webs 230 and 232 extend between the abutment flanges 226 and 228 and the alignment flanges 224 and 225, thereby defining multiple recesses 230a, 232a between the alignment flanges 224 and 225 and the abutment flanges 226 and 228 around the circumferential exterior of the body 212. In a preferred form, however, and unlike the coupling 10, each alignment flange 224 and 225 only has one corresponding abutment flange 226 and 228 extending from the outer side wall 224a and 225a of the alignment flanges 224 and 225. The portion of fitting 210 that is perpendicular to portions 212a and 212b does not include an alignment flange but, rather, includes an abutment flange 229 equidistant from the open end 217 of body section 212c as the abutment flanges 226, 228 are from their respective open ends 214, 216. This makes the insertion depth the same for each connection. The abutment flange 229 preferably extends in a plane that is generally perpendicular to the planes within which abutment flanges 226, 228 extend and the diameters of abutment flanges 226, 228 and 229 preferably being smaller in diameter than the alignment flanges 224 and 225 and, in one form, having a diameter of six hundred forty thousands of an inch (0.640 in.) compared to a nine hundred thousands of an inch (0.900 in.) diameter for the alignment flanges 224 and 225.

As with the abutment flanges 26 and 28 of coupling 10, the abutment flanges 226 and 228, and the connecting webs 230 and 232 progressively increase in diameter to provide a tapering configuration for injection molding purposes.

During installation of the fitting 210, any of ends 214, 216 and 217 of the fitting 210 may be inserted into an open end of conduit until the end of the conduit abuts the respective outer side wall 226a, 228a and 229a of the abutment flanges 226, 228 or 229. Once the end of the conduit abuts the abutment flange 226, 228 or 229, that end of the coupling 210 has been fully inserted into (or installed in) the conduit, and the other ends 217, 216 or 214 of fitting 210 may now be inserted into another open end of conduit. For example, the first end 214 of fitting 210 may be inserted into an open end of conduit and forced into the conduit until the open end of the conduit abuts the outer surface 226a of abutment flange 226. At this point, the first end 214 of fitting 210 is considered to be fully installed or inserted into the conduit. Once done, the process can be repeated by inserting one of the other ends 216, 217 into another open conduit end and forcing the fitting into the conduit until the open end of the conduit abuts the outer surface 228a or 229a of abutment flanges 228 or 229. Once this is done, the third and final barbed fitting 217, 216 may be inserted into another open conduit end in similar fashion.

In order to reduce the amount of insertion force that is required to insert fitting 210 into conduit, the fitting 210 has been designed with a smaller outer barb diameter and a smaller barb taper than conventional fittings. For example, in the form illustrated, the outer barb diameter has been reduced from six hundred eighty thousands of an inch (0.680 in.) to six hundred thirty thousands of an inch (0.630 in.), and the barb taper has been reduced from twenty four degrees (24°) to fourteen degrees (14°). As mentioned above, it should be understood that other outer barb diameters and barb tapers may be selected in order to reduce the insertion force required to insert fitting 210 into conduit while still maintaining an acceptable extraction force and/or in order to accommodate varying ranges of tubing sized.

Turning now to FIGS. 4A-B and 5A-B, there are illustrated two different types of alternate fittings in accordance with the invention. In keeping with the above, common features between the embodiment illustrated in FIGS. 4A-B and the previous embodiments disclosed in FIGS. 1A-3C will use the same last two digits in its reference numerals, while prefixing the reference numerals with the number "3" in order to distinguish this embodiment from the prior embodiments. Similarly, common features between the embodiment illustrated in FIGS. 5A-B and the previous embodiments discussed above will use the same last two digits in its reference numerals, while prefixing the reference numerals with the number "4" in order to distinguish this embodiment from the prior embodiments.

More particularly, FIGS. 4A-B and 5A-B illustrate male adaptors 310, 410 having an axially elongated one-piece molded plastic body 312, 412 with opposite open ends 314, 316 and 414, 416 and an internal fluid carrying passage 318, 418 interconnecting the opposite open ends 314, 316 and 414, 416. The bodies 312, 412 have first barbed portions 316, 416 of a first inner and outer diameter and shape similar to those illustrated and discussed above with respect to FIGS. 1A-3C, and second threaded portions 314, 414 of a second inner and outer diameter that starts at their open end with an external male threading 314a, 414a and terminates at the midsection of the fitting in a wrenching surface, such as hexagonal nut surfaces 315, 415. These wrenching surfaces 315, 414 allows the fitting to be tightened with a wrench or other tool to ensure the external tapered threads of the threaded portion 314a engage and mate with corresponding internal threads of another component to prevent leaks and achieve effective non-leaking fluid connection between the components.

In a preferred form, the threaded end 314 of fitting 310 (FIGS. 4A-B) comprises a ½" Male Pipe Thread (or National Pipe Thread Tapered Thread, MNPT or MPT), which has a larger inner and outer diameter than the barbed end 316 so that the fitting 310 can connect conduit, such as irrigation tubing, to larger irrigation tubing, such as swing pipe tubing, swing joints, etc., or other irrigation components, such as spray bodies, saddle tees, etc. In the form illustrated in FIGS. 5A-B, however, the threaded end 414 of fitting 410 comprises a ¾" Male Pipe Thread, which has an even larger inner and outer diameter than the barbed end 416 and threaded end 314. This allows the male adapter 410 to be connected to still other types of conduit and/or irrigation components.

In order to reduce the amount of insertion force that is required to insert fittings 310 and 410 into conduit, the fittings 310, 410 have been designed with smaller outer barb diameters and smaller barb tapers than conventional fittings. For example, in the form illustrated, the outer barb diameter has been reduced from six hundred eighty thousands of an inch (0.680 in.) to six hundred thirty thousands of an inch (0.630 in.), and the barb taper has been reduced from twenty four degrees (24°) to fourteen degrees (14°), just like the fittings of FIGS. 1A-3C. As mentioned above, it should be understood, that other outer barb diameters and barb radii or angles may be selected in order to reduce the insertion force required to insert fittings 310 and 410 into conduit while still maintaining acceptable extraction forces for same.

Yet another fitting in accordance with the invention is illustrated in FIGS. 6A-C. This fitting will be identified by reference numeral 510 and use the last two digits of its reference numerals to designate items that are common to those discussed above with respect to fittings 10, 110, 210, 310 and 410 and having similar two digit numbers at the end of their reference numeral. As illustrated in FIGS. 6A-C, the fitting 510 comprises somewhat of a combination of the tee fitting 210 and the male adapter 310 discussed above and is sometimes referred to as a Barbed T Connector with Male Thread or, simply, a tee fitting with Male Pipe Thread.

The fitting 510 includes an elongated body 512 having three open ends 514, 516 and 517, and an internal "T" shaped fluid carrying passage 518 interconnecting the ends 514, 516 and 517. The body 512 having a leak proof wall that defines the passage 518 extending through the elongated body 512, which is made-up of three intersecting wall sections 512a, 512b and 512c. The first and second end sections 514, 516 each having externally formed primary or lead barbs 520 and 522 and secondary or intermediate barbs 521 and 523. The lead barbs 520, 522 and the secondary barbs 521, 523 are of progressively increasing diameter to provide a tapering configuration that diverges toward a midsection of the body 512 where all three body sections 512a, 512b and 512c intersect. Both sets of barbs 520, 522 and 521, 523 aid in retaining the conduit that the barbed end 514, 516 is inserted into; however, the lead barbs 520, 522 are larger in diameter than the secondary barbs 521, 523 and provide greater resistance to extraction forces that may be applied to the conduit. It should be understood that in alternate embodiments, the fitting 510 may be configured without secondary barbs 521, 523 and/or that any of the above-mentioned fittings 10, 110, 210, 310 or 410 may be designed with secondary barbs similar to secondary barbs 521, 523, if desired for a particular application (e.g., see FIGS. 9A-11 as examples of some of these fittings with secondary barbs).

The body 512 also has multiple large radially-outwardly extending, circumferential alignment flanges 524 and 525 positioned on the midsection of the body 512. Each is equidistant from its adjacent open end 514 and 516. The alignment flanges 524 and 525 extend in planes that are generally parallel to one another and perpendicular to the longitudinal axis of the fluid carrying passage portion made up of sections 512a and 512b of body 512 and between ends 514 and 516.

The tee fitting with MPT 510 further includes radially-outwardly extending abutment flanges 526, 528 and 529, with at least flanges 526 and 528 being equally spaced from the open ends 514 and 516, and axially from the alignment flanges 524 and 525. A plurality of connecting webs 530 and 532 extend between the abutment flanges 526 and 528 and the alignment flanges 524 and 525, thereby defining multiple recesses 530a, 532a between the alignment flanges 524, 525 and the abutment flanges 526, 528 around the circumferential exterior of the body 512. The abutment flanges 526, 528 and connecting webs 530, 532 progressively increase in diameter to provide a tapering configuration to assist with the injection molding process used for making fitting 510.

In the form illustrated in FIGS. 6A-C, each alignment flange 524, 525 only has one corresponding abutment flange 526, 528 extending from the outer side walls 524a, 525a of the alignment flanges 524, 525. The portion of fitting 510 that is perpendicular to portions 512a and 512b does not include an alignment flange but, rather, includes an abutment flange 529 spaced generally equidistant from the central point of intersection "I" as the other abutment flanges 526, 528. The abutment flange 529 preferably extends in a plane that is generally perpendicular to the planes within which abutment flanges 526, 528 extend, and the diameters of abutment flanges 526, 528 and 529 are preferably of a size smaller in diameter than the alignment flanges 524, 525. In the embodiment illustrated, the abutment flanges 526, 528 have a diameter of six hundred forty thousands of an inch (0.640 in.) and the alignment flanges 524, 525 have a diameter of nine hundred thousands of an inch (0.900 in.).

During installation of the fitting 510, the barbed ends 514, 516 may be inserted into open ends of conduit until the respective ends of conduit abut the respective outer side wall 526a, 528a of the abutment flanges 526, 528. Once the ends of the conduit abuts the abutment flange 526, 528, the first and second ends 514, 516 of coupling 510 have been fully inserted into (or installed in) the conduit. Similarly, a female connector may be connected to the Male Pipe Thread of fitting end 517 to connect the fitting 510 to another piece of conduit or another irrigation component, as discussed above.

In order to reduce the amount of insertion force that is required to insert the first and second ends 514, 516 of the fitting 510 into conduit, the fitting 510 has been designed with a smaller outer barb diameter and a smaller barb taper than conventional fittings. For example, in the form illustrated, the outer barb diameter has been reduced from six hundred eighty thousands of an inch (0.680 in.) to six hundred thirty thousands of an inch (0.630 in.), and the barb taper has been reduced from twenty four degrees (24°) to fourteen degrees (14°). As mentioned above, it should be understood, that other outer barb diameters and barb tapers may be selected from the ranges provided above in order to reduce the insertion force required to insert fitting 210 into conduit while still maintaining an acceptable resistive force against extraction.

Although reducing the outer barb diameter and barb taper effectively reduces the amount of insertion force required for installing fittings, some may view the fittings as still being relatively difficult to install. Thus, an insertion tool like that depicted in FIGS. 7A-D (and further discussed below) also may be provided and used to assist in inserting the barbed ends of the fittings into conduit, such as flexible drip irrigation tubing (e.g., flexible polyethylene tubing).

As illustrated in FIGS. 7A-D, the barbed fitting insertion tool 600 is a hand-held tool with a generally syringe like configuration comprising a fitting securing portion, such as fitting receptacle or barrel 602, and a grasping portion, such as handle portion 604. The barrel 602 defines a receptacle for receiving at least a portion of a barbed fitting (see, e.g., fittings 10, 110, 210, 310, 410 or 510 above). The handle 604 is ergonomically configured so that an installer may efficiently grip and hold the tool 600 while loading a barbed fitting in the receptacle 602 and installing the barbed fitting into an end of a section or conduit (e.g., flexible irrigation tubing) or other fluid carrying component. More particularly, the tool 600 has a longitudinal access 601 running the length of the barrel 602 and into the handle 604, and a generally semicircular cross-section extending from an open end or side of the tool and around the longitudinal access 601 of the tool 600.

Figure 7A:
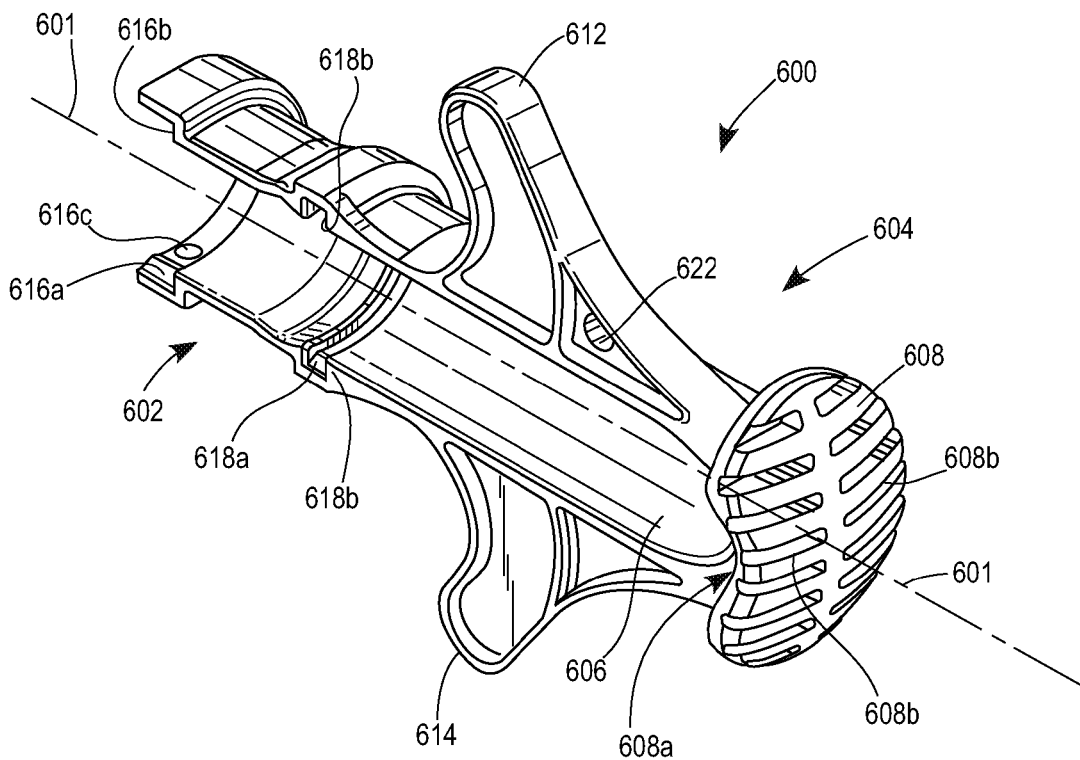
FIGS. 7A-D are perspective, left side elevational, front elevational and right side elevational views, respectively, of a barbed fitting insertion tool in accordance with one form of the invention.

The cross-section reduces in the handle portion 604 of the tool 600 to guide the flexible tubing that has already been connected to a portion of the barbed fitting out of the tool (see FIG. 7A). This guide 606 is gradual so as to not kink the flexible tubing as more tubing is installed on the opposite end of the fitting.

In the form illustrated, the open end or side of the tool opens toward the left side of the tool 600 when held by a right handed person. However, it should be understood that the tool could be rotated one hundred and eighty degrees (180°) and held by a left handed person so that the open end or side of the tool opens toward the right side of the tool 600 if desired. It should also be appreciated that while such orientations of the tool 600 are preferable for right and left handed persons, respectively, a right handed person could hold the tool so that it opens to the right and a left handed person could hold the tool so that it opens to the left, if desired. Still further, persons could hold the tool so that the open end or side opens toward the top of the tool 600 or so that it opens toward the bottom of the tool 600, if desired.

As illustrated in FIGS. 7A-D, the handle portion of the tool 604 includes a palm rest, such as pad 608, located at the rear of tool that is ergonomically designed to comfortably rest within the palm of an installer's hand (e.g., with the installer's fingers extending out from one side of the palm pad and the installer's thumb extending out from the other or opposite side of the palm pad, and preferably at the thumb indentation 608a). The palm pad 608 has a general kidney bean shape with a plurality of slots 608b extending from the middle of the palm pad 608 to its outer periphery to form a type of grip that assists the installer in gripping and holding the tool. In some forms, these slots 608b may further define egress channels which allow for drainage of any water that may exist on the outer surface of the palm pad 608 or between this surface and the palm of the installer's hand so that the installer can firmly grip the tool 600 and to assist in preventing the tool 600 from slipping when gripped by the installer.

Figure 11A:
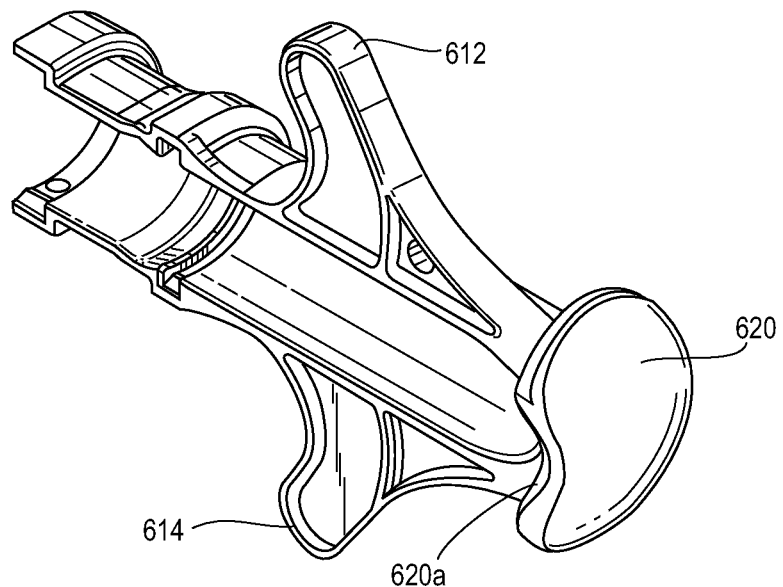
FIGS. 11A-B are perspective and exploded views of an alternate barbed fitting insertion tool in accordance with another form of the invention.
Figure 11B:
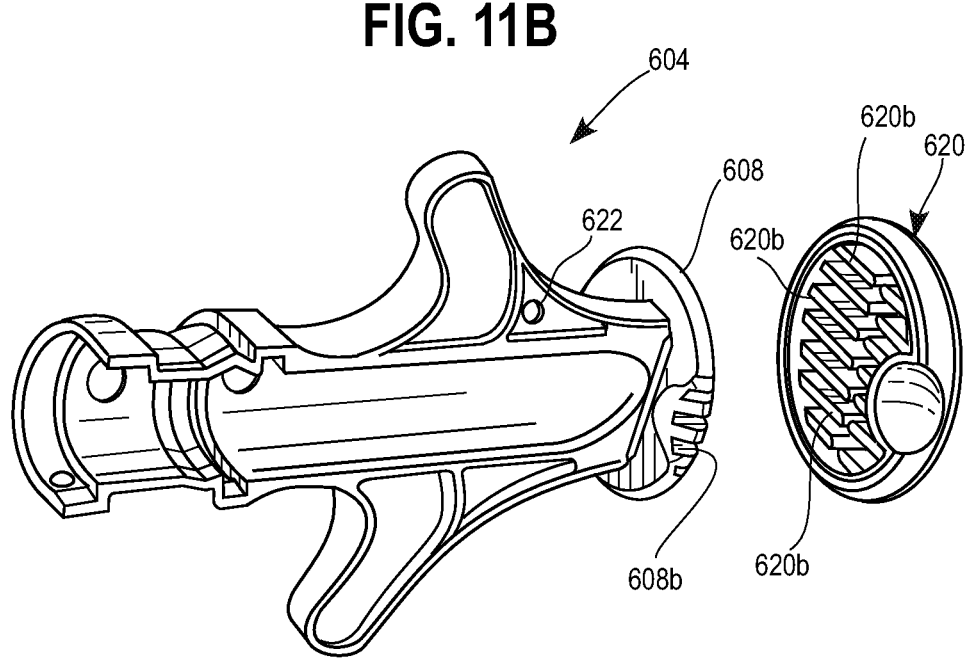

In alternate embodiments, the tool 600 may include an ergonomic pad cover 620, such as that illustrated in FIGS. 11A-B. In the form illustrated, the pad cover 620 comprises an elastomer injected overmolding made of softer material that connects to the palm pad 608. For example, in the form illustrated, the pad cover 620 snaps onto or friction fits to the palm pad 608 by using the thumb indentation cover portion 620a and thumb indentation 608a of palm pad 608 to form a tongue and groove like connection. In addition, ribs 620b may be used to properly align the pad cover 620 on the palm pad 608 and/or to further friction fit the pad cover 620 on the palm pad 608 should the ribs be made large enough to require press fitting between the slots 608b of the palm pad 608. It should be understood, however, that in alternate embodiments other types of locking or securing arrangements can be used to secure the pad cover 620 to the palm pad 608, regardless of whether these releasably secure the cover 620 to the pad 608 or, alternatively, permanently secure the pad cover 620 to the palm pad 608. For example, in an alternate embodiment, the pad cover 620 may be overmolded onto the palm pad 608 such that it is permanently connected thereto. In other forms, the pad cover 620 may be attached to the palm pad 608 using adhesives, heat staking or heat shrinking. In still other forms, the pad cover 620 may be releasably secured to the palm pad 608 via hook and loop fastener.

In this embodiment as well as in the embodiment depicted in FIGS. 7A-D, the tool 600 may also include a tethering hole 622 for connecting the tool 600 to a separate item to make it more easy and convenient to carry. For example, a carabiner may be connected directly to the tethering hole 622, or indirectly via a rope or string. In yet other forms, the tool 600 may be connected to a ring with other useful tools or keys.

Turning back to the embodiment illustrated in FIGS. 7A-D, the handle portion 604 further includes flanges 612 and 614 that extend out from opposite sides of the barrel 602. The flanges are curved toward the front opening 602a of the tool 600 and away from the rear of the tool where the palm pad 608 is located so that the installer can grip the tool like a syringe and securely hold the tool while drawing his or her fingers toward his or her palm, a natural clenching motion for gripping items. It should be understood that, regardless of the specific embodiment implemented, the configuration of the tool 600 allows the operator or user of the tool to use an action that is not only coaxially aligned with the fitting and the direction the operator intends to move the fitting in (rather than offset therefrom), but also includes an effective gripping and drive surface that the operator can grasp using a fist or clenching type motion to directly drive the fitting into the conduit from behind (rather than from an awkward coaxial or circumferential manner).

The barrel 602 of the tool further includes radially-inwardly extending, semicircular recesses or sockets 616 and 618 (e.g., semicircular cavities, channels or grooves) that are configured to mate with radially-outwardly extending, circumferential alignment flanges (see, e.g., alignment flanges 24, 124, 125, 224, 225, 524 and 525 of FIGS. 1A-6C) located on the barbed fittings specifically configured for use with this tool (see, e.g., fittings 10, 110, 210, 510 of FIGS. 1A-6C). Examples of how these fittings mate and interlock with the tool 600 are illustrated in FIGS. 8A-12.

As illustrated in FIGS. 8A-B, the straight coupling fitting 10 only uses one alignment flange 24 to secure the fitting 10 to the tool 600 at the outermost socket 616. The elbow fitting 110 is secured to the tool 600 in a similar manner. However, with respect to the tee type fittings 210, 510, two alignment flanges 224, 225 and 524, 525 may be used to secure the fittings 210, 510 to the sockets 616, 618 of the tool (see, e.g., FIG. 9). It should be noted, however, that both flanges 224, 225 and 524, 525 do not always have to be used to secure fittings 210, 510 to the tool 600, but rather the fitting could be positioned in the fitting receptacle so that only one flange engages socket 616, if desired.

In a preferred form, the tool sockets 616, 618 capture the alignment flanges (see, e.g., alignment flanges 24, 124, 125, 224, 225, 524 and 525 of FIGS. 1A-6C) that are inserted therein and prevent the fitting (see, e.g., fittings 10, 110, 210, 510 of FIGS. 1A-6C) from moving laterally and longitudinally within the barrel 602 of the tool body. More specifically and as illustrated best in FIGS. 7A and 7C, the inner wall of at least one of the tool sockets 616, 618 has enough of a radius to form a general C-shape member 616a, 618a and create a locking engagement (e.g., friction or snap fit) between the tool 600 and the fitting 10, 110, 210 or 510. This locking engagement helps prevent lateral movement of the fitting out of the barrel 602 of the tool.

More specifically, the inner diameter of the socket 616, 618 is sized to fit the outer diameter of the fitting (see fittings 10, 110, 210, 510 above) and the opening to the socket is slightly narrower than the diameter of the fitting so that when the fitting is pressed into the socket 616, 618 the distal ends of the socket are deflected open and then snap back around the outer diameter of the fitting to secure the fitting within the socket 616, 618. For example, in the form illustrated in FIGS. 7A-D, the alignment flanges of the fitting having an outer diameter of nine hundred thousandths of an inch (0.900 in.) and the inner diameter of the socket 616, 618 is nine hundred ten thousandths of an inch (0.910 in.). Thus the diameter of the socket 616, 618 is large enough to accommodate or fit the diameter of the fitting. The opening to the socket 616, 618 is seven hundred thousandths of an inch (0.700 in.) wide and has inner surfaces of the distal ends of the socket that are cammed at a seventy degree (70°) taper angles (see FIG. 7C) so that the distal ends of the socket are tapered to accept the alignment flange (see, e.g., alignment flanges 24, 124, 125, 224, 225, 524 and 525 of FIGS. 1A-6C) of the fitting when pressed therein.

More particularly, the tapering aligns the fitting within the opening of the socket 616, 618 and the distal ends of the socket deflect open wider to accept the alignment flange and then snap back to their original shape around the alignment flange when fully inserted into the socket to capture the alignment flange within the socket and, thus, the fitting within the retaining recess of the tool. This snap fit arrangement and resiliency of the distal ends of the socket also allows the fitting to be pulled out of the retaining recess of the tool by allowing the alignment flange to deflect the distal ends of the socket to increase the size of the opening and release the alignment flange, thereby releasing the fitting from the fitting receptacle or barrel 602 of the tool. Once removed, the distal ends of the socket return or snap back to their original shape and width opening so that the socket is ready to receive the next fitting.

Although the snap fitting described above is preferable, it should be appreciated that in alternate embodiments, different types of securing mechanisms may be used to secure and interlock the fitting into the retaining recess of the tool. For example, in another form, the inner diameter of the socket may be slightly less than the outer diameter of the alignment flange, but still C shaped such that when the alignment flange is being inserted into the socket, the upper opening expands open to receive the alignment flange and then, once inserted, the distal ends of the socket wrap around the fitting and bias against the alignment flange to maintain the barbed fitting interlocked to the tool. In yet other forms, the retaining recess may have a structure that mates with a corresponding structure on the fitting in order to secure the fitting to the tool. For example, one or more of the sockets may be designed with prongs for engaging the circumferential recesses formed by the connecting webs extending between the abutment flanges and the alignment flanges.

In yet other forms, the securing mechanism may include a press-fit friction retention arrangement or an overmolding of an elastomeric element to provide a friction fit for retention of the fitting within the fitting receptacle or its sockets. For example, in one form, overmolding may be used to employ a retention feature, such as a spring steel clip, for securing the fitting to the tool 600.

Figure 7B:
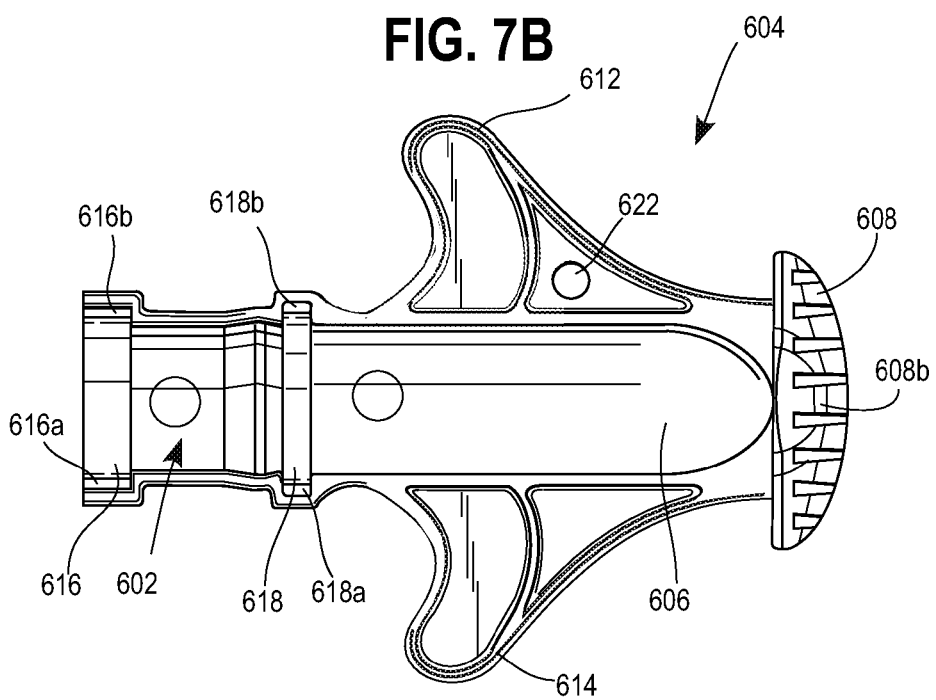
Figure 7D:
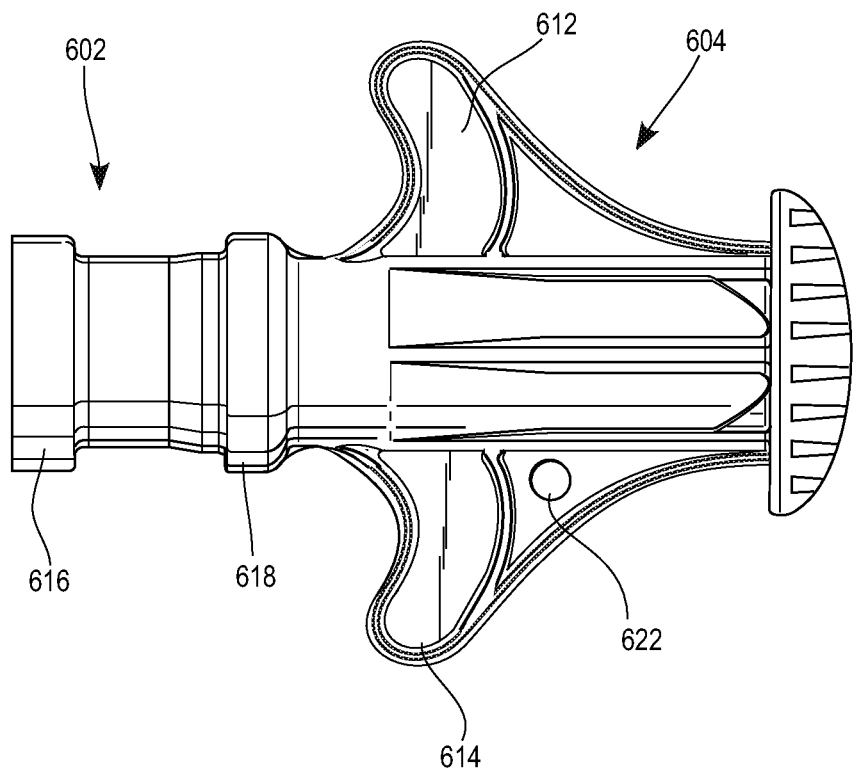
Figure 7C:
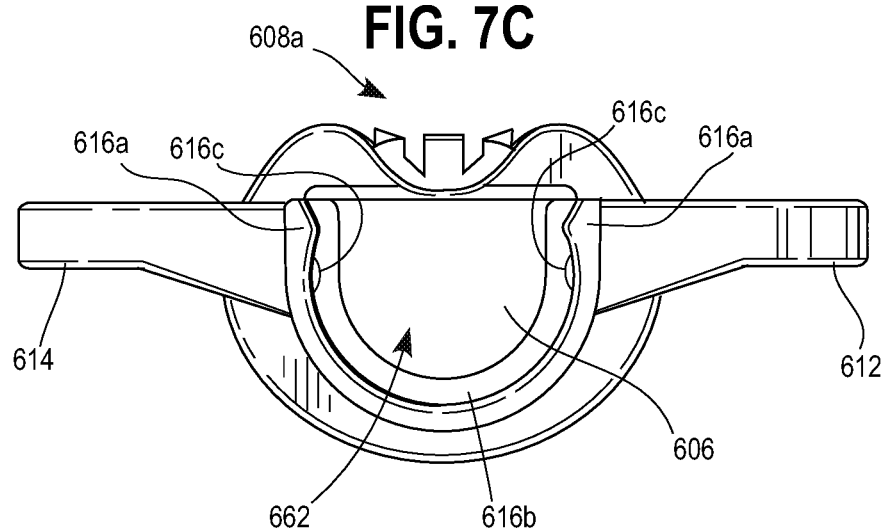

In addition to the above and as illustrated best in FIGS. 7A-B, one or more of the outer socket 616 and inner socket 618 provides a shoulder or surface 616b, 618b against which the alignment flange (24, 124, 125, 224, 225, 524 and 525) of the fitting abuts and may be pushed against while the installer uses the tool to insert a barbed fitting into flexible irrigation tubing. The outer socket also preferably includes at least one protrusion, such as beads 616c (see FIGS. 7A, 7C and 8B) located on the inner semicircular walls of the outer tool socket 616, which create a locking engagement between the alignment flange of the fitting and the tool as best shown in FIG. 8B. That is, the alignment flange (e.g., 24, 124, 125, 224, 225, 524 and 525) is sandwiched between the beads 616c and the shoulder 616b of the outer socket 616, and this prevents longitudinal movement of the fitting (10, 110, 210, 510) within the barrel 602 of the tool 600 along the longitudinal axis thereof. With the assistance of these features, the fitting may be aligned and press locked into place within the tool such that the installer will not need to hold the fitting in the tool, while trying to insert the fitting into the end of irrigation tubing. Rather, the installer will be able to hold the tool and fitting with one hand, while holding the flexible tubing into which the fitting is to be inserted with his or her other hand.

Figure 12A:
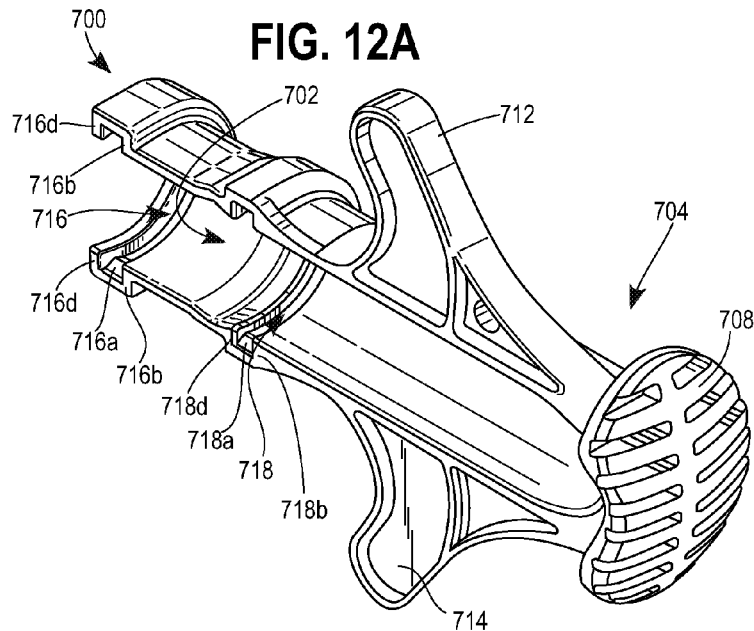
FIGS. 12A-B are perspective and side elevational views of another barbed fitting insertion tool in accordance with another form of the invention.
Figure 12B:
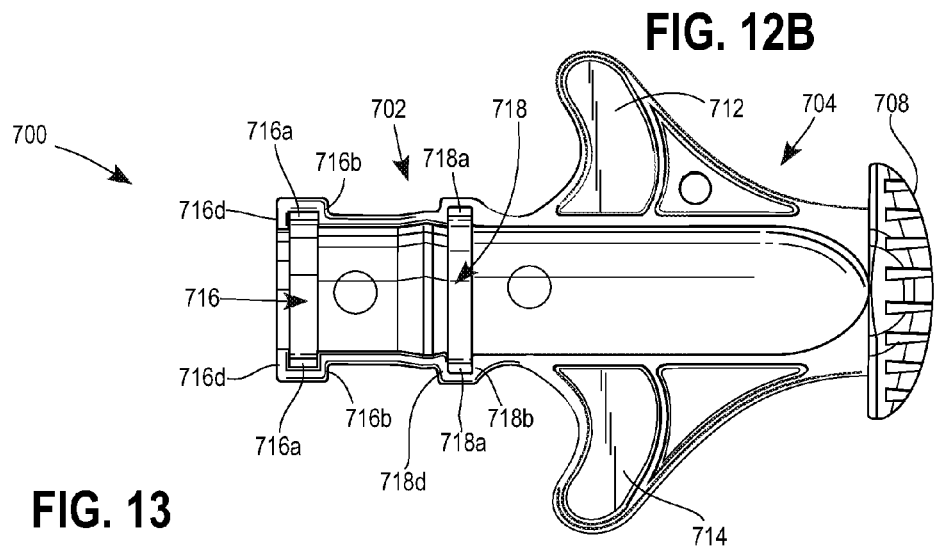
Figure 13:
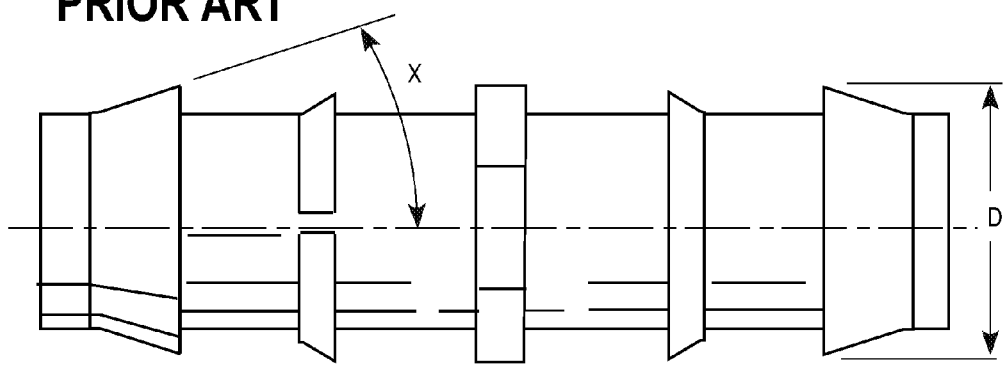
FIG. 13 is a conventional barbed fitting known in the art that has been available for more than a year before the filing date of the instant application.

Yet another form of the insertion tool is illustrated in FIGS. 12A-B. This tool will be identified by reference numeral 700 and use the last two digits of each reference numeral to designate items that are common to those discussed above with respect to tool 600 and that have similar two digit endings in their reference numeral. Like the previous embodiment, insertion tool 700 is a hand-held tool with a generally syringe like configuration having a fitting securing portion 702 and a grasping portion 704, with a palm pad 708 and gripping flanges 712, 714. The tool 700 has a longitudinal access running the length of the barrel 702 and into the handle 704, and a generally semicircular cross-section extending from an open end or side of the tool and around the longitudinal access of the tool 700.

The barrel 702 of the tool includes two identical radially-inwardly extending, semicircular recesses or sockets 716 and 718 that are configured to mate with radially-outwardly extending, circumferential alignment flanges (see, e.g., alignment flanges 24, 124, 125, 224, 225, 524 and 525 of FIGS. 1A-6C) located on the barbed fittings specifically configured for use with this tool (see, e.g., fittings 10, 110, 210, 510 of FIGS. 1A-6C). More particularly, first socket 716 has a side wall 716d, which not only defines a channel along with side wall 716b in which the alignment flange of a fitting is nested to secure the fitting to the tool 700, but also acts as a stop for preventing movement of the fitting along the longitudinal axis of the tool 700.

Side wall 716d of first socket 716 prevents longitudinal movement of the fitting regardless of the amount of force that is applied to the fitting and regardless of whether the fitting is a coupling, elbow or other type fitting that may only have one alignment flange captured in the first socket 716 of the tool 700. Although this wall 716d now prevents the fitting from being able to be inserted into or removed from the front of the tool 716 via movement of the fitting along the longitudinal axis of the tool 716, it also allows the side wall 716d, to cooperate with wall 718d of socket 718 to collectively prevent longitudinal movement of tee type fittings and other fittings that have two alignment flanges captured in respective first and second sockets 716, 718. In addition, walls 716a, 716b, 716d of socket 716 and walls 718a, 718b and 718d of socket 718 now form generally U-shaped channels that are capable of capturing the outer circumferential surfaces (e.g., front, side and rear surfaces) of the alignment flange (or flanges) and provide shoulders or surfaces against which the alignment flange (24, 124, 125, 224, 225, 524 and 525) abuts and may be pushed against while the installer uses the tool to insert a fitting into flexible irrigation tubing, as well as, pulled against while the installer uses the tool to remove a fitting from flexible irrigation tubing.

Although the snap fitting described above for capturing the fitting is preferable, as mentioned above, it should be appreciated that in alternate embodiments different types of securing mechanisms may be used to secure and interlock the fitting into the retaining recess of the tool (e.g., press-fit/friction-fit engagements, mating engagements, overmolded retention features, etc.). It should also be understood that changes to the actual shapes of the components of the tool may be made in alternate embodiments so long as these features continue to provide the functions discussed above with respect to capturing fittings and assisting the operator in inserting such fittings into conduit or other water carrying components as may be needed in the industry.

In addition to the above, the barbed fitting insertion tool 600 is also designed such that the installer may initially use the distal end of either flange 612, 614 to flare the end of the flexible irrigation tubing so that it will be easier to insert the barbed end of the fittings into the flexible irrigation tubing. More particularly and as illustrated in FIG. 10, the installer can insert the distal end of either flange of the handle portion of the tool into the end of the flexible irrigation tubing 11 to stretch the opening of the tubing so that the installer can more easily insert the barbed end of a fitting into the tubing.

The insertion tool and fittings may be made with conventional manufacturing techniques (e.g., injection molding processes) and using conventional plastics used in these processes, and are preferably resistant to impact damage as well as water damage. In addition, the fittings are preferably made in conventional sizes (e.g., 17 mm insert fitting size, ¼" insert fitting size, etc.).

With respect to all of the fittings discussed above, they may include a single barb on their ends or primary barbs located on the end of the fitting and intermediate bards located inward of the primary bard toward the midsection of the fitting. The intermediate barbs may be of a smaller diameter and/or size than the primary barbs. In a preferred form, the fittings will only have a single or primary barb and will be capable of being made with a barb angle that is reduced to fourteen degrees (14°) and an overall smaller diameter. This reduced angle balances providing an easier insertion of the fitting in the tubing with a sufficient gripping force to prevent the flexible tubing from separating from the fitting when fluid is moved therethrough.

It should also be understood that, in keeping with the invention disclosed herein, a system or kit may be provided consisting of some combination of any of the above items. For example, a kit may be provided for aiding in the insertion of barbed fittings including at least one fitting having at least one barbed end extending therefrom and a fitting insertion tool in accordance of the embodiments disclosed herein. The fitting and fitting receptacle of the tool may have corresponding mating structures coordinated to mate and secure the fitting and tool to one another similar to those discussed above. The system may also include flexible tubing conduit that can either be sectioned and interconnected via the fittings or connected to at least one other irrigation component via the fittings.

In view of the above, it should be understood that many methods are also disclosed herein including but not limited to methods of reducing insertion forces required to install fittings into conduit, methods of inserting those fittings into conduit and/or other irrigation components and methods of manufacturing barbed fittings.

While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims, and the specific embodiments disclosed herein are not limiting on the scope of the appended claims.

What is claimed is:

1. A fitting insertion tool for inserting barbed fittings into conduit comprising:
   a body defining a fitting receptacle in a front portion of the body and a handle portion in a rear portion of the body;
   the fitting receptacle having a locking mechanism for securing at least a portion of the fitting to the tool against unintentional detachment from the tool; and
   the handle having an engageable support pad connected to the rear of the body and at least one flange extending from the body and defining a gripping surface which an operator may use to drive a fitting into conduit, wherein the at least one flange extending from the body comprises flanges extending from opposite ends of the body with each flange being curved away from the rear of the body to provide a curved gripping surface.

2. A fitting insertion tool according to claim 1, wherein the pad includes a thumb recess for accommodating a thumb of the user so that the user can conveniently grip the tool by placing a portion of the palm of his or her hand on the pad with his or her thumb extending over the thumb recess toward the front of the tool and his or her fingers extending from the opposite side of the pad and over the curved flanges so that the user can grip the tool by drawing his or her fingers toward his or her palm in a natural clenching motion.

3. A fitting insertion tool for inserting barbed fittings into conduit comprising:
   a body defining a fitting receptacle in a front portion of the body and a handle portion in a rear portion of the body;
   the fitting receptacle having a locking mechanism for securing at least a portion of the fitting to the tool against unintentional detachment from the tool; and
   the handle having an engageable support pad connected to the rear of the body and at least one flange extending from the body and defining a gripping surface which an operator may use to drive a fitting into conduit, wherein at least one of the flanges includes a distal end sized and shaped to be inserted into an opening of the conduit to flare or stretch the conduit opening so that the conduit opening is easier to insert a fitting therein.

4. A fitting insertion tool according to claim 3, wherein the at least one flange has a wider proximal base portion connected to the body of the tool and a narrower distal end for insertion into the opening of the conduit so that the conduit opening flares or stretches as the flange travels further into the conduit opening and the conduit opening approaches the wider base portion of the flange.

* * * * *